(12) United States Patent
Josephson et al.

(10) Patent No.: US 7,983,795 B2
(45) Date of Patent: Jul. 19, 2011

(54) NETWORKED ELECTRICAL INTERFACE

(76) Inventors: Kurt Josephson, Rye, NY (US); Marc Josephson, Rye, NY (US)

( * ) Notice: Subject to any disclaimer, the term of this patent is extended or adjusted under 35 U.S.C. 154(b) by 573 days.

(21) Appl. No.: 12/025,271

(22) Filed: Feb. 4, 2008

(65) Prior Publication Data

US 2008/0221737 A1 Sep. 11, 2008

Related U.S. Application Data

(60) Provisional application No. 60/905,983, filed on Mar. 8, 2007, provisional application No. 60/929,078, filed on Jun. 12, 2007.

(51) Int. Cl.
*G05B 21/00* (2006.01)
(52) U.S. Cl. .................................................. 700/276
(58) Field of Classification Search .................. 700/275, 700/276, 278, 296, 299, 300, 286
See application file for complete search history.

(56) References Cited

U.S. PATENT DOCUMENTS

| | | | |
|---|---|---|---|
| 4,060,123 A | 11/1977 | Hoffman et al. | |
| 5,294,838 A | 3/1994 | Juravich | |
| 6,167,389 A | 12/2000 | Davis et al. | |
| 6,181,985 B1 | 1/2001 | O'Donnell et al. | |
| 6,301,674 B1 | 10/2001 | Saito et al. | |
| 6,553,336 B1 | 4/2003 | Johnson et al. | |
| 6,624,532 B1 | 9/2003 | Davidow et al. | |
| 6,828,695 B1 | 12/2004 | Hansen | |
| 6,845,918 B2 | 1/2005 | Rotondo | |
| 6,904,385 B1 | 6/2005 | Budke, Jr. | |
| 6,993,417 B2 | 1/2006 | Osann, Jr. | |
| 7,039,532 B2 | 5/2006 | Hunter | |
| 7,049,932 B2 | 5/2006 | French et al. | |
| 7,061,393 B2* | 6/2006 | Buckingham et al. | 340/693.3 |
| 7,184,861 B2 | 2/2007 | Petite | |
| 7,208,697 B2* | 4/2007 | Blankenship et al. | 219/130.21 |
| 7,216,021 B2 | 5/2007 | Matsubara et al. | |
| 7,263,450 B2 | 8/2007 | Hunter | |
| 7,640,512 B1 | 12/2009 | Appling | |
| 2002/0091784 A1 | 7/2002 | Baker et al. | |
| 2003/0084112 A1 | 5/2003 | Curray et al. | |
| 2005/0131553 A1 | 6/2005 | Yoon et al. | |
| 2005/0216580 A1 | 9/2005 | Raji et al. | |
| 2006/0161275 A1 | 7/2006 | Plankl et al. | |
| 2006/0251086 A1 | 11/2006 | Ha et al. | |
| 2007/0168088 A1 | 7/2007 | Ewing et al. | |
| 2008/0217419 A1* | 9/2008 | Ehlers et al. | 236/44 C |

* cited by examiner

*Primary Examiner* — Albert Decady
*Assistant Examiner* — Chad Rapp
(74) *Attorney, Agent, or Firm* — Kenyon & Kenyon LLP

(57) ABSTRACT

An electrical interface may include a switching mechanism and a control module. The switching mechanism can selectively couple a source of electricity to a load and the control module can be coupled to the switching mechanism. The control module may generate a query for information from a web server and control the switching mechanism based on a response to the query.

40 Claims, 4 Drawing Sheets

NETWORKED ELECTRICAL INTERFACE

This application claims the benefit of U.S. Provisional Application No. 60/905,983, filed Mar. 8, 2007, and U.S. Provisional Application No. 60/929,078, filed Jun. 12, 2007.

BACKGROUND

1. Technical Field

Embodiments of the present invention generally relate to power consumption and demand regulation. More particularly, embodiments relate to electrical load interfaces that may be controlled remotely based on the current price of electricity, temperature and/or scheduling information.

2. Discussion

The deregulation of electric utilities that has occurred over the last several years has resulted in a large scale decoupling of power production from distribution in many jurisdictions. Accordingly, distributors have become mega-purchasers of power and may be more exposed to power price risk than any other industry. In jurisdictions where deregulation has progressed significantly, utilities have already experienced a vulnerability to power price spikes. Indeed, on one day during a heat wave in Chicago, the spot market price peaked at $7,000 per megawatt hour, which was more than 175 times the normal price. While power distributors have begun to employ more innovative financial "hedging" solutions, such as futures contracts, to lessen their exposure to such extreme spot market prices, spikes in consumer demand (during, for example, the summer months) can still lead to unexpectedly high costs of electricity. These added costs may be passed on to the consumer in the form of higher electricity prices.

Conventional residential and commercial environments often use static thermostats to establish a desired level of operation for devices such as central air conditioners and wall/window air conditioners. For example, a typical air conditioner thermostat might be set manually by the consumer to a temperature of 72° F., which causes the air conditioner to power up at ambient temperatures above 72° F. and power down at ambient temperatures below 72° F. While these types of localized, static, temperature-based controls have been acceptable under certain circumstances, considerable room for improvement remains. For example, during times of extremely high consumer demand, the price of electricity could be so high that a previously-established thermostat setting may no longer be cost-effective or desirable to the consumer. Conventional thermostat devices typically may not be able to take into consideration the current price of electricity with regard to temperature-controlled equipment. In addition, other equipment such as clothes dryers are not set up to take advantage of time of day electrical pricing.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
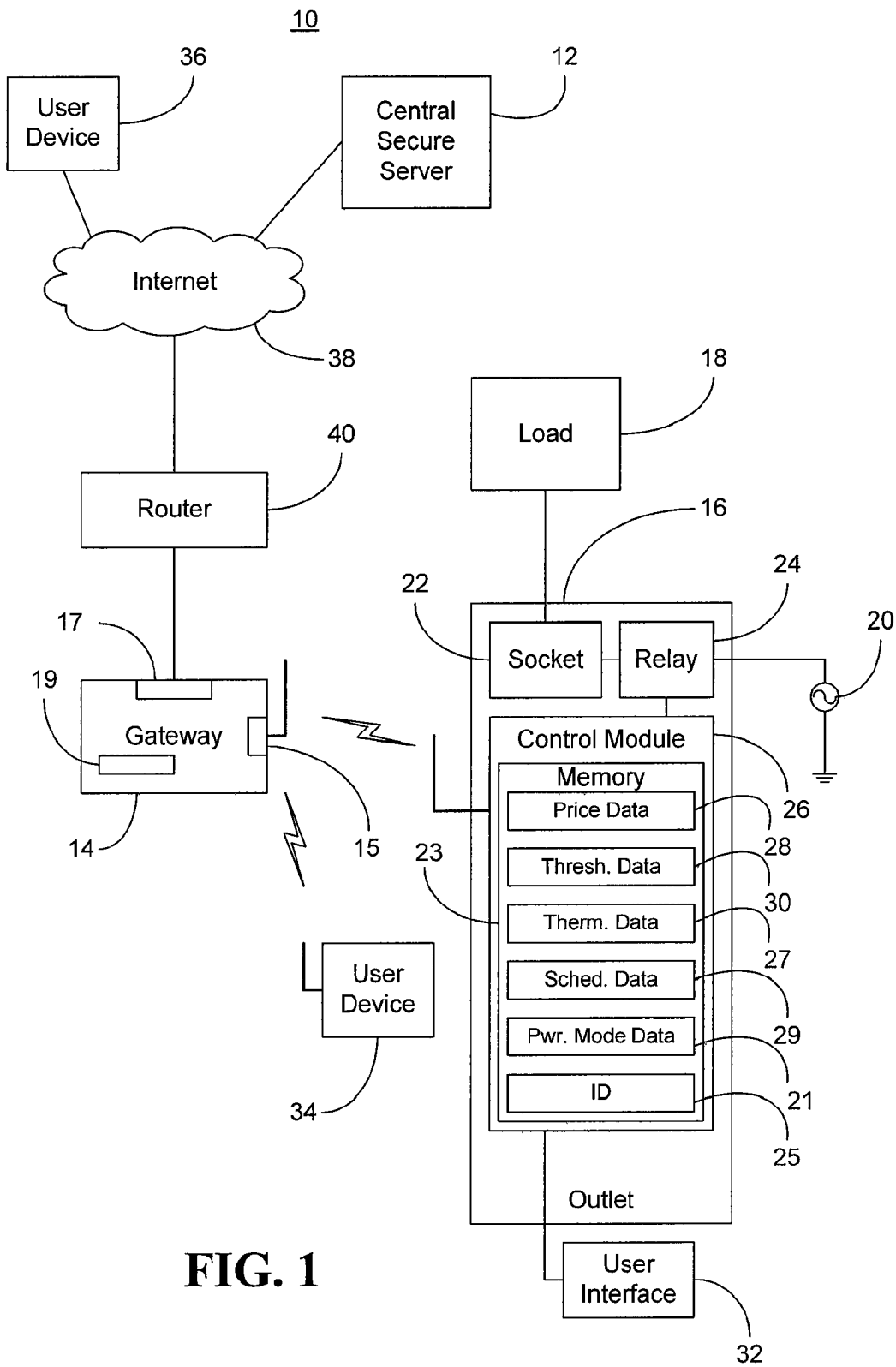
FIG. 1 is a block diagram of an example of an energy management system according to an embodiment of the invention.

An embodiment of the present invention provides for an electrical interface that includes a switching mechanism and a control module. The switching mechanism can selectively couple a source of electricity to a load and the control module can be coupled to the switching mechanism. The control module may generate a query for information from a web server and control the switching mechanism based on a response to the query.

Another embodiment of the present invention provides for a gateway that includes a first interface, a processing module and a second interface. The first interface may receive a query for information, wherein the query includes a unique identifier of an electrical interface to a load and first data having at least one of a thermostat setting and a price threshold. The processing module can convert the query into a web request and the second interface may transmit the web request to a web server.

Yet another embodiment of the present invention provides for a computer-readable medium comprising a set of instructions which, if executed by a processor, cause the web server to receive a first web request for information. The first web request may include a unique identifier of an electrical interface to a load and first data having at least one of a thermostat setting, a price threshold and a power mode. Execution of the instructions can also cause the web server to retrieve a record associated with the unique identifier and generate a response to the first web request based on the record.

An embodiment of the present invention also provides for an electrical interface that includes a thermostat, a control module, a memory and a user interface. The thermostat may selectively couple a source of electricity to an air conditioner, and the control module may be coupled to the thermostat to generate a query for information from a web server. The control module can also transmit the query wirelessly to a gateway, and control the thermostat based on a response to the query. The query may include a unique identifier of the electrical interface, first data having at least one of a thermostat setting, a price threshold, and a power mode, and an indication of whether the first data has changed. The response may include second data having at least one of a thermostat setting, a current price of electricity, a price threshold and scheduling information. The memory can store the first and second data, and the user interface can enable user control of the thermostat. The user interface may have a display and an input device.

Another embodiment of the present invention provides for a relay coupled to an electrical load and a source of electricity, and a control module coupled to the relay. The control module controls the relay based on the current price of electricity and a predetermined price threshold. The price threshold may be set locally by manipulating a user interface of the electrical interface or other user device, or remotely with a user device having an Internet connection, for example. Similarly, the current price of electricity may be obtained locally from a "smart" electrical meter, remotely over the Internet, or from another source. The outlet may be used for a wide variety of both temperature-controlled and non temperature-controlled equipment.

FIG. 1 shows an energy management system 10 having a central secure server 12, a gateway 14 and an electrical interface such as an outlet 16 coupled to an electrical load 18 and a source of electricity 20. The illustrated outlet 16 therefore functions as an electrical interface to the load 18. While a single outlet 16 and load 18 are shown for simplicity, multiple outlets (or electrical interfaces) and loads may be used in the energy management system 10. The illustrated load 18 may be any type of electronic equipment such as an air conditioner, pool heater, water heater, clothes dryer, photocopier, laser printer, water cooler, HVAC and so on. In the illustrated example, the outlet 16 is associated with a unique identifier ("ID") 25, and has a socket 22, and a relay 24 coupled to the socket 22 and the source 20. While a socket 22 that mates with a power plug of the load 18 is shown to facilitate discussion, the electrical interface may use other mechanisms to connect to the load 18, such as a circuit breaker connection, in-line connection or other connection from the load 18 to the source 20. Indeed, the entire electrical interface/outlet 16 may be incorporated into the load 18 and/or its associated enclosure. A control module 26 may be coupled to the relay 24, wherein the control module 26 has processing resources (not shown) and memory 23, and can generate a query for information from the server 12 and control the relay 24 based on the server's response to the query.

As will be discussed in greater detail below, the query may include the unique ID 25 of the electrical interface/outlet 16, a thermostat setting (i.e., "thermostat data") 27, a power mode (i.e., "power mode data") 21, a price threshold (i.e., "threshold data") 30, a load type identifier and an indication of whether the data stored in memory at the outlet 16 has changed. In addition, the control module 26 can generate the query according to scheduling information (i.e., "scheduling data") 29 stored at the outlet 16. The response from the server 12 may facilitate control of the relay 24 by providing data identifying the unique ID 25 of the electrical interface/outlet 16, a thermostat setting, data identifying a current price of electricity (i.e., "price data") 28, data identifying a predetermined price threshold, data identifying a power mode, and/or data identifying scheduling information. If problems, such as payload encryption errors, are detected in the query and/or associated web request, the response from the server 12 may also include a specialized packet that instructs the electrical interface 16 to reboot itself in an effort to correct the problems. By enabling the consumer or other authorized entity to establish thermostat settings and/or predetermined price thresholds remotely over an Internet connection, the illustrated system 10 provides greater flexibility and more robust control over electrical costs than conventional approaches.

The outlet 16 may have a user interface 32 that enables user control of the relay 24 and other functions. As discussed in greater detail below, the user interface 32 may include a current temperature display, a thermostat setting display, and a thermostat input, which enable the consumer to visually determine the current temperature by observing the current temperature display, determine the thermostat setting by observing the thermostat setting, and modify the thermostat setting by manipulating the thermostat input at the outlet 16. The user interface 32 may also include a current price display, a threshold display and a threshold input, which enable the consumer to visually determine the current price of electricity by observing the current price display, determine the price threshold by observing the threshold display, and modify the price threshold by manipulating the threshold input at the outlet 16. The illustrated system 10 also includes a user device 34, such as a tablet personal computer ("PC"), which can enable the consumer to view and set the price thresholds of multiple pieces of equipment (i.e., loads).

Both the outlet 16 and the user device 34 may communicate wirelessly with the gateway 14. The wireless protocol may be based on the wireless personal area network (WPAN, e.g., IEEE Std 802.15.4-2006, Sep. 8, 2006, IEEE Computer Society) protocol, the Bluetooth (e.g., Bluetooth Core Specification, Ver. 2.1, Aug. 1, 2007, Bluetooth Special Interest Group) protocol or any other suitable protocol. In one embodiment, the wireless protocol may be a proprietary protocol that is optimized for small packets and uses unique identification numbers for each outlet 16. The thermostat data 27 and threshold data 30 may also be set remotely from a user device 36 over the Internet 38. In such a case, the user device 36 may be a PC, Blackberry® device, personal digital assistant ("PDA"), cell phone, or any other web enabled device, that logs onto the central secure server 12, which tracks the electricity usage of load 18, and reports current price data 28, thermostat data 27, scheduling data 29 and threshold data 30 for each electrical outlet associated with the consumer's account. The consumer may therefore determine whether one or more of the pieces of equipment are operating at, near or above the temperature and/or price threshold and adjust each temperature and/or price threshold as desired. The new settings may be communicated from the central secure server 12 back to each outlet 16 as devices make their periodic status inquiries.

The gateway 14 may have a first interface 15 that receives the query from the control module 26. The first interface 15 might be a local transmission link with a wireless, power line communication and/or Ethernet component. As already noted, the query may include a unique identifier of the outlet 16, a thermostat setting, a price threshold, a load type identifier, power mode indicator and/or an indication of whether the transmitted data has changed. A processing module 19 may convert the query into a web request and a second interface 17 may transmit the web request to the web server 12. The second interface 17 could include an Ethernet port or other type of communication functionality. In the downlink direction, the illustrated second interface 17 receives a response from the web server 12 to the web request in a first format (e.g., standard web reply format), the processing module 19 can convert the response into a second format (e.g., optimized for small packets), and the illustrated first interface transmits the response in the second format to the uniquely identified outlet 16. As already noted, the response may include data identifying a thermostat setting, current price of electricity, price threshold, power mode and scheduling information, as well as an indication of whether or not any change represents a server-based override.

The central secure server 12 may include a web server having processing and memory resources capable of servicing web requests. For example, upon execution of the appropriate program and/or software instructions, the server 12 can receive a first web request for information, wherein the first web request includes a unique identifier of the outlet 16 or other electrical interface to a load, a thermostat setting and/or a price threshold. The illustrated server 12 then retrieves a record associated with the unique identifier and generates a response to the first web request based on the record. The first web request may also include an indication of whether the first data has changed, wherein the web server 12 is able to update the record based on the data from the outlet 16 if such data has changed. As already noted, the response may include thermostat settings, current price of electricity, price thresholds scheduling and/or other information such as reboot instructions. The web server 12 may establish the thermostat settings and price thresholds in the web response based on the scheduling information where appropriate. If necessary, the web server may also query a pricing source for the current price of electricity.

One of the difficulties in communicating from a central server to a large number of distributed devices may be determining the proper IP address and port number of each piece of equipment. This is because almost all routers have a single IP address assigned by the Internet service provider (usually cable company or telephone company), and all the devices attached to the router, whether wired or wireless, share that single IP address. This sharing feature has been a great benefit in conserving the limited number of actual IP addresses, but means that each piece of equipment communicating over the Internet does not necessarily have a unique IP address. The other benefit is that it is more difficult to hack into these devices because they do not have a fixed, or even real, IP address. This is especially true for residential users.

For increased security, many routers include a default filtering capability to block all unanticipated traffic from the Internet. The assumption is that unsolicited traffic is likely to be malicious or a nuisance, and is therefore blocked. The converse is not true—all web requests from local devices on the router can be assumed to generate responses from web servers that need to be directed back to the originating device. This is a basic function of routers—keeping track of which device issued requests, and directing responses back to the originating device.

Accordingly, the illustrated system uses a data transfer scheme that goes "backwards"—from the equipment to the central secure server 12. The concept is that all devices attached to a router 40 use the router 40 as their gateway to the Internet, and the router 40 keeps track of the actual device that requests a remote web page and directs the response from the web server to the appropriate device. The illustrated gateway 14 therefore communicates with the web-based central secure server 12, and the router 40 makes sure that responses from the central secure server 12 go only to the gateway 14. This way, it is not necessary to determine the actual shared IP address of the router 40, or the dynamic port number that it uses to keep track of all the devices attached to it.

Since a unique ID has been assigned to each outlet 16 and gateway 14, and the unique ID is sent within the encrypted web request from the outlet 16 and gateway 14, the server 12 knows that it is receiving a valid web request from a known outlet 16 and processes the request appropriately. Standard SSL (Secure Sockets Layer, Internet Engineering Task Force/IETF) encryption, which is built into every web browser, may be used to make sure that no one can monitor the energy management traffic and be in a position to either record information, or more importantly, to be able to control any of the outlets 16. In addition, AES (e.g., Advanced Encryption Standard, Federal Information Processing Standards Publications/FIPS PUBS 197, Nov. 26, 2001) can be used for encryption of web request and response payloads. Other encryption methods, which can be incorporated into the central secure server 12, the gateway 14 and the outlet 16 as appropriate, may also be used.

Packet Structure

The following is an explanation of an example of the packet structure for devices communicating in the system 10. This explanation, which is non-exhaustive and is provided to facilitate discussion only, can be used to write firmware on a wide variety of architectures while maintaining full functionality and the ability to interface with the web server 12. To use encryption, it can be assumed that the PacketPayLoad is a 32 byte encrypted chunk. A "packetlen" character is used because it is irrelevant to the gateway 14 whether the message is encrypted or not. The gateway 14 does not try to parse the message, and can merely pass the message on to the next step up or down the ladder from it. For encryption, the PacketPayLoad will be represented in hex. The term "binof" refers to the binary representation of a number or character as a byte.

From Electrical Interface to Gateway Wireless Component:
  ^+binrep of packetlen (ex-bin(16))+WebAddr (ex-AC)+ DevID (10 char's last 4 are nums)+PacketPayload The binary representation is specific to the current wireless chipset. If a new generation transmits only ASCII (e.g., PLC or new wireless) this can readily be changed to a two character representation of the packet length and will not affect the overall system since a new chipset or PLC may require new chips for both the end device and the gateway for them to communicate. As long as a new chipset is self consistent and follows the conventions for other steps in the protocol, full functionality can be achieved.

An example implementation of communications from an A/C to a gateway:
  ^binof(16)+AC(device type)+ACTester0023(theDevID)+ S(Set or No Change)+0(mode)+87(temp)

Example packet:
  ^binof(16)ACTester0023S087

From Wireless Gateway Port to the Ethernet Gateway Port: 1) sync up with the ^ char; 2) Read the binlen, save it as binlen; 3) put ^ on the serial port; 4) convert (binlen-12) to a two char representation of the len; 5) put 2 char len representation of binlen-12 on the serial port; 6) receive and put next binlen chars on the serial port.

Example packet:
  ^04ACTester0003S088

The web server 12 can be set up with multiple directories and multiple pages, so the web request sent from the gateway 14 to the server 12 may include the complete web address, including directory and page.

From Gateway Ethernet port to Web server (using Internet link): 1) sync up with the ^ char; 2) read the packet len chars, convert it to actual bin rep and save as packetlen; 3) receive next 2 chars into DevType (for the web addr associated with that device type); 4) receive next 10 chars into DevID; 5) receive next packetlen characters into incoming serial buffer, then add string ender to incomingserial buffer ('\0'); 6) parse the DevType characters following the packetlen and add them as a directory, then the page name then ".php?data=" to the web addr; 7) put the receive buffer after the data=in the web request; 8) Send the web request.

Example packet from Wireless Gateway Port to the Ethernet Gateway Port:
  ^04ACTester0003S088

Example URL requested by Ethernet port (to server):
  example.com/AC/AC.php?data=Tester0003S088

Web Reading:—the appropriate page (e.g., AC.php) will get AC.php?data=Tester0003S088, and will read and parse the data tag then formulate a response.

Web response:
  ^+2charrep of length aka "12"+devID(10 chars ex: Tester0022)+rest of payload(ex:S2)

Example web response packet:
  ^12Tester0022S2

Gateway Ethernet port web response from server: 1) read until see ^; 2) read next two chars into 3 char datatemp buffer (last char is the '\0' string ending null char); 3) convert to bin rep of length put in resplenbin int; 4) write ^+resplen to serial port, then read next resplen chars to the serial port.

Example of what gets written on serial:
^12Tester0002S2

Gateway wireless port from Ethernet port: 1) sync up with ^ char; 2). read next two chars into 3 char resplen buffer (last char is the '\0' string ending null char); 3) convert to bin rep of length, put in resplenbin int; 4) read next resplen characters into send buffer; 5) read last 4 characters of device id. this is the new short address (4 digit number) to send to; 6) send buffer of size resplenbin over wireless to the short address just calculated from the DevID (don't need resplen included since electrical interface knows how long resp is)

DevIDs can be made any character sequence for 10 characters, wherein last 4 are numbers. Accordingly, "AB23Ea3324" would be valid. The last 4 characters, which are numbers, represent the local device ID. This approach enables up to 10,000 local devices communicating through the same gateway—but allows the DevID to serve as a unique identifier on the local network while eliminating any need to dynamically or individually program the identifier while on site. With millions of unique electrical interfaces, the odds of two devices with same channel ending up in same house are small. Moreover, such a case can be corrected via a customer support fix. Thus, the above approach allows for 500 trillion unique device ID's if AlphaNumerics case sensitive are used for the first 6 characters (assuming math of (26×2–for case sensitive alphabet+10 for the possible digits involved in alphanumerics)^6×10,000(for last four digits)=number in the hundreds of trillions.

The web server 12 may also receive a login request from a web-enabled device such as user device 36, wherein the login request includes user identifier and password information. If the illustrated server 12 is able to validate the user based on the login request, a set (i.e., one or more) of unique identifiers of electrical interfaces to loads is retrieved, wherein the unique identifiers are associated with the user identifier. The server 12 may then generate a web response to the login request based on the set of unique identifiers. During the authenticated session, the server 12 may also receive a web request to modify thermostat settings, price thresholds and schedules associated with one or more of the set of unique identifiers, and update the appropriate records.

Figure 2B:
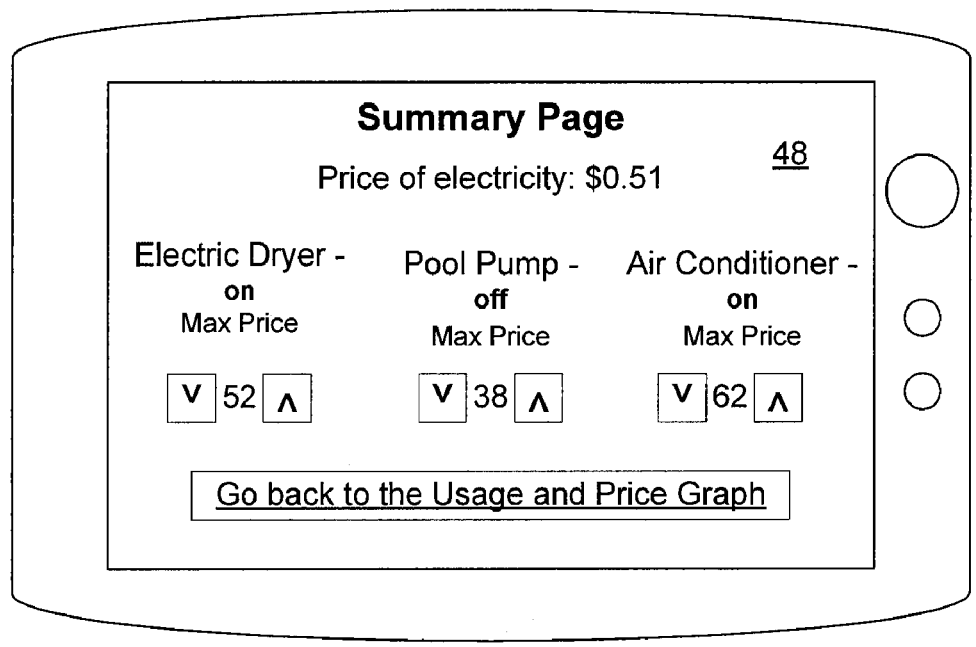
FIG. 2B is an illustration of an example of a user device according to an embodiment of the invention.
Figure 2A:
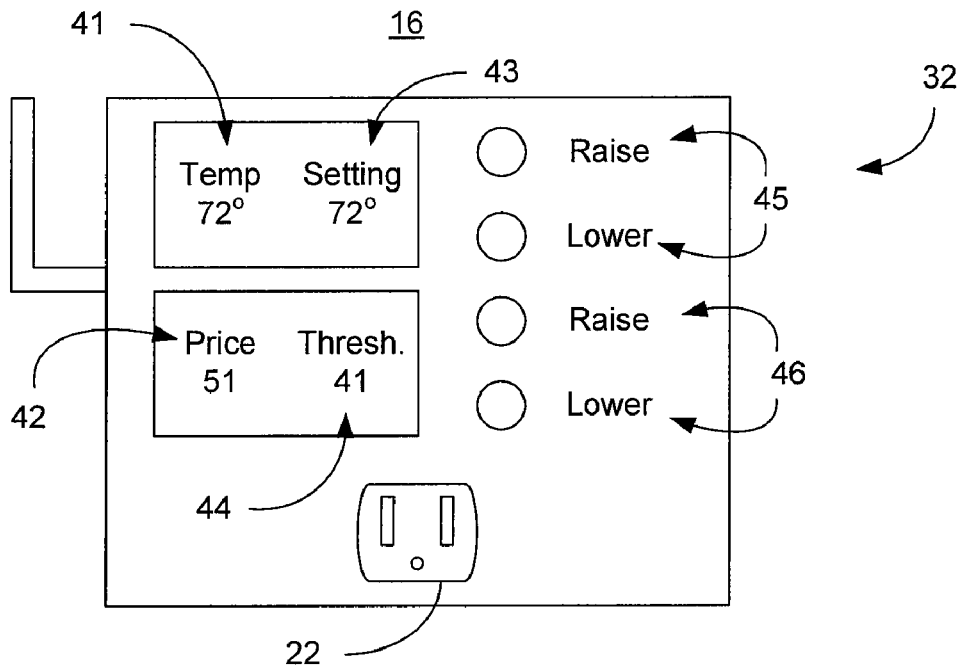
FIG. 2A is a diagram of an example of an electrical interface according to an embodiment of the invention.

Turning now to FIGS. 2A and 2B, an illustration of an outlet 16 and user device 34 is shown in greater detail, respectively. In the illustrated example, the outlet 16 has one or more sockets 22 and a user interface 32 that includes a current temperature display 41, a thermostat setting display 43, thermostat input switches 45, a current price display 42, a price threshold display 44 and threshold input switches 46. As already discussed, the input switches 45, 46 may be used by the consumer to manually adjust the upper limits of the thermostat and current price for the outlet 26. In the illustrated example, the current price ("51") exceeds the price threshold ("41"), and therefore power is disconnected from the sockets 22 so that any equipment plugged into the sockets 22 will not function.

Figure 3:
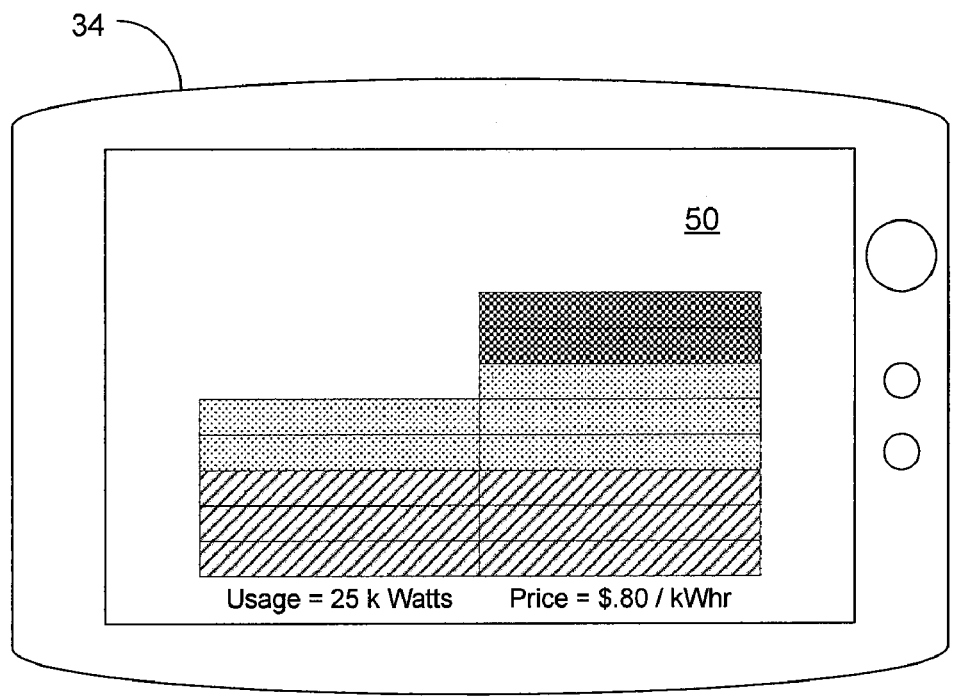
FIG. 3 is an illustration of an example of a usage and price graph display according to an embodiment of the invention.

The illustrated user device 34 includes a summary page 48 that displays both the current price of electricity and the predetermined price threshold for a plurality of loads (e.g., electric dryer, pool pump, air conditioner). A similar page may be constructed for temperatures and thermostat settings. The illustrated summary page 48 also enables the consumer to adjust each price threshold up or down and indicates whether the load in question is on or off. By selecting the touch-screen button at the bottom of the summary page 48, the consumer may be taken to a usage and price graph 50 (FIG. 3), which provides a graphical representation of the status of each piece of equipment.

Figure 4:
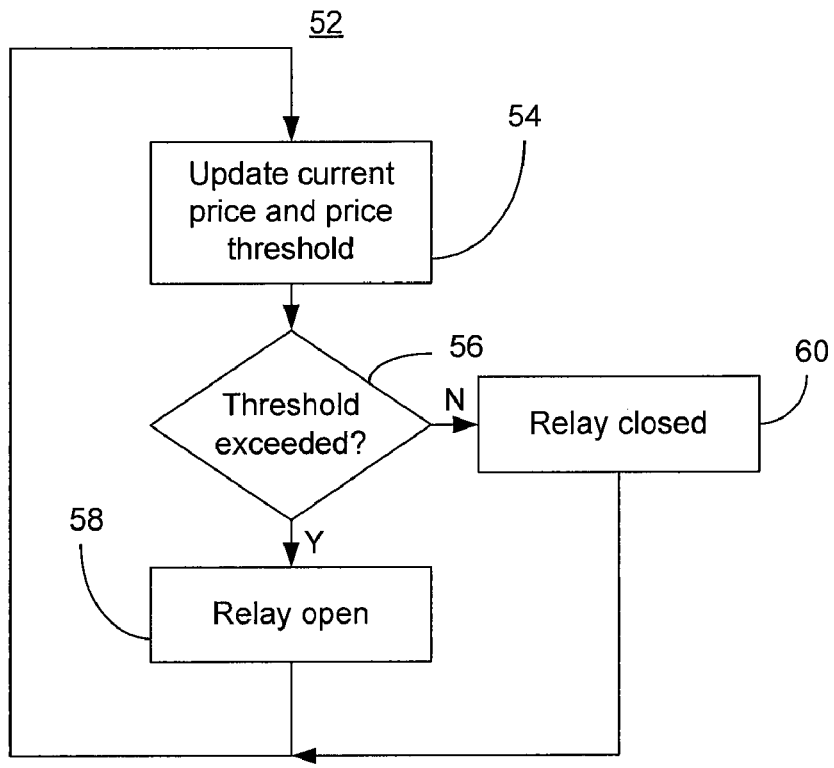
FIG. 4 is a flowchart of an example of a method of controlling an electrical outlet based on price according to an embodiment of the invention.

FIG. 4 shows a method of controlling an electrical outlet. The method 52 may be implemented in a control module 26 (FIG. 1) as a set of machine readable instructions stored in a medium such as a random access memory (RAM), read only memory (ROM), electrically erasable programmable ROM (EEPROM), flash memory, etc., as fixed functionality hardware such as an embedded microcontroller or application specific integrated circuit (ASIC) using complementary metal oxide semiconductor (CMOS) technology or transistor-transistor-logic (TTL) technology, and/or any combination thereof.

In the illustrated example, the processing block 54 provides for updating a current price of electricity and a predetermined price threshold. In one example, the current price of electricity may be obtained from a "smart" electric meter that is at the premises of the outlet. Alternatively, the current price may be obtained from a remote server such as the central secure server 12 (FIG. 1) or another web based server. The price threshold may be already stored to a memory location, wherein the price threshold can be obtained via a local user interface, a local user device, or a remote user device. In one embodiment, the most recent price data and threshold data is transmitted, along with the unique ID of the outlet, to the central secure server as a query for a price and/or threshold update. Upon receiving the request, the central secure server may obtain updated pricing information and determine whether the price threshold has been modified (for example by the subscriber using a PC-based Internet connection). The central secure server may then transmit a response back to the outlet, wherein the response identifies the unique outlet identifier and contains updated price data and threshold data. The control module of the outlet may store such price data and threshold data to an appropriate memory location and use this data to conduct a comparison at block 56. If it is determined at block 56 that the price threshold has been exceeded, the relay that provides the connection between the power source and the socket may be opened at block 58, which removes power from the socket and any load connected to the socket. If the threshold has not been exceeded, block 60 provides for keeping the relay closed, which enables power to be delivered to the socket and corresponding load. The method 52 may be readily adapted to provide for thermostat setting updates as already discussed.

Figure 5:
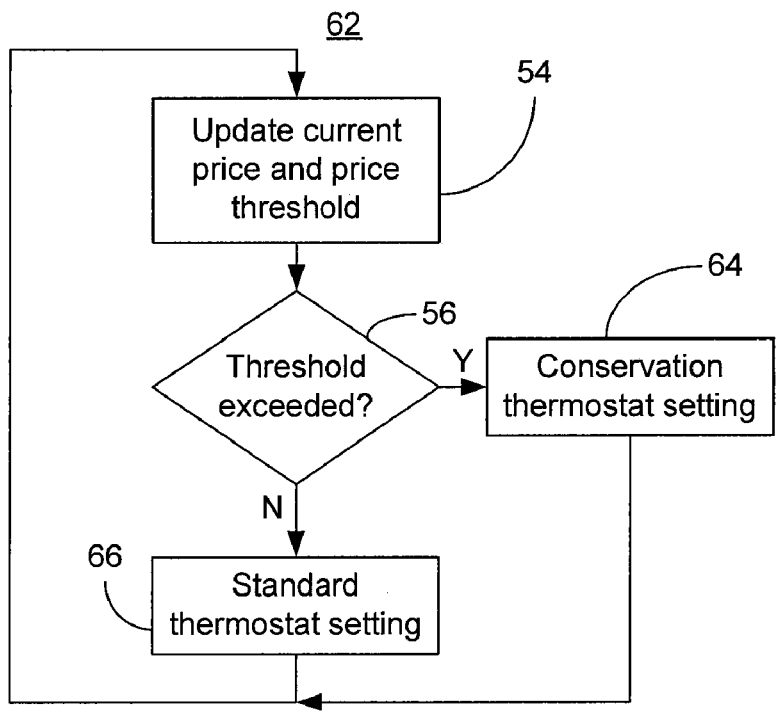
FIG. 5 is a flowchart of an example of a method of controlling a thermostat based on price according to an embodiment of the invention.

FIG. 5 shows an alternative approach in which a thermostat is controlled according to a method 62. In particular, block 54 provides for updating a current price of electricity and a predetermined price threshold as already discussed. If it is determined at block 56 that the threshold is exceeded, block 64 provides for establishing a "conservation" thermostat setting, which is some amount higher than the standard thermostat setting. For example, the conservation thermostat setting can be defined as being 8° F. warmer than the standard thermostat setting, so that an initial thermostat setting of 72° F. would be increased to 80° F. whenever the price threshold has been exceeded by the current price of electricity. As a result, temperature-controlled equipment such as an air conditioner would not turn on until the ambient temperature reaches 80° F. during periods of high consumer demand. If it is determined that in block 56 that the threshold is not exceeded, block 66 provides for using the standard thermostat setting, which is whatever the consumer originally established. Of course, thermostat settings may also be retrieved from the central secure server, if such functionality is appropriate.

Figure 6:
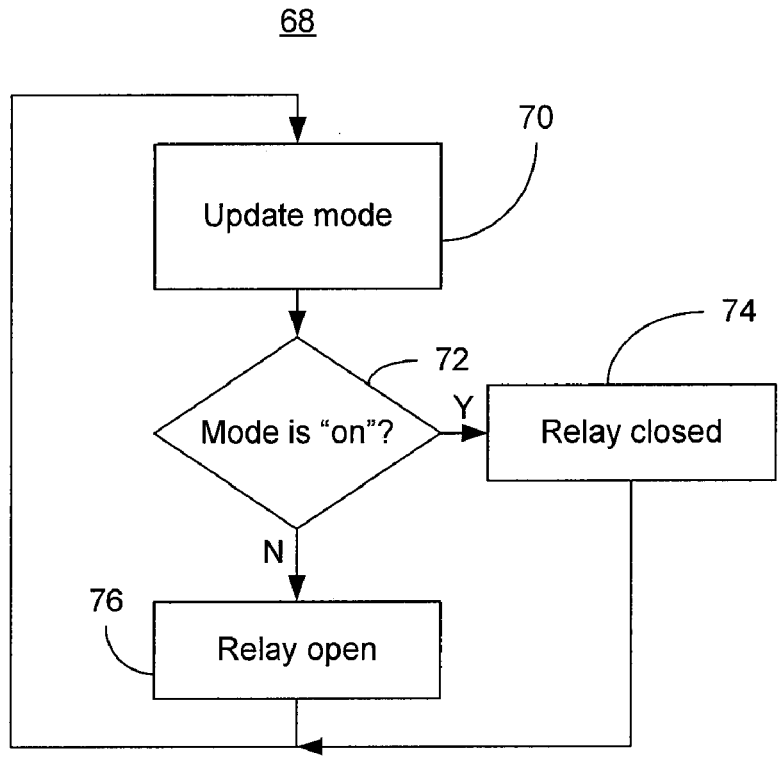
FIG. 6 is a flowchart of an example of a method of controlling an electrical outlet based on power mode according to an embodiment of the invention.

FIG. 6 shows another method 68 in which an electrical outlet is controlled based on a power mode of the outlet. In the illustrated example, the mode of the outlet is updated at block 70 and block 72 provides for determining whether the mode is "on". The mode may be obtained from the central secure server 12 (FIG. 1) or locally at the device. For example, the server may transition the mode from "off" to "on" in order to enforce a schedule established by a user of a web-based connection. If it is determined that the mode is "on", then illustrated block 74 provides for closing the relay associated with the outlet, which enables power to be delivered to the socket and corresponding load. If it is determined that the mode is "off", then the relay can be opened at block 76 in order to remove power from the socket and any load connected to the socket.

Thus, switching mechanisms such as thermostats, relays and circuit breakers may be Internet-controlled and designed for window and wall air conditioners, as well as other types of loads. In one example, the underlying system can include a central secure server, a thermostat with a relay to control power to an air conditioner, and a "gateway" device to communicate with multiple thermostats and to communicate with the central secure server. Such a system can reduce electrical demand resulting from room air conditioners (either window or through-the-wall units). The thermostat may allow electricity to pass to the air conditioner when the room temperature is equal to or greater than the current thermostat setting, or when the current price of electricity is below the current pricing threshold. The central secure server may also control the thermostat setting and/or pricing threshold. For example, the server can send new thermostat settings to the thermostats via the gateways, which may control groups of thermostats using proprietary control protocols. Communications between the central secure server and the gateway can be encrypted using a standardize protocol such as AES. Communication between the gateways and the groups of thermostats associated with the gateway can be via WPAN, Ethernet (e.g., IEEE 802.3), WiFi (e.g., IEEE 802.11), a proprietary wireless communications protocol, or any other suitable protocol. An advantage of such a system is that it may allow utilities and facilities managers to remotely control window air conditioners to reduce electrical demand, to save money, and to avoid brown-outs and black-outs due to excessive electrical demand.

In one embodiment, the wireless protocol between thermostats and gateways is based on an IEEE 802.15.4 standard, wherein additional protocol aspects are used to optimize communications for small packets and provide a unique identification number for all thermostats. The protocol between the gateways and central secure server can use a client "push/pull" scheme from the thermostat to the server that bypasses firewalls, network address translations (NAT), pop-up blockers, etc. The protocol can also contain unique identifier for each thermostat (and its corresponding air conditioning unit), encryption using AES (e.g., sent via http), self throttling traffic control (to prevent server traffic overrun) and the transmission of separate control packets to each thermostat. Control packets are sent in response to status queries when there is a new thermostat setting or price threshold on the server, and new settings can be accepted only from authorized parties.

The gateway may service any number of multiple thermostats to reduce the number of Internet connections required in an installation. In a single family home, for example, there may be a single gateway which communicates with all of the air conditioners and other controlled loads in the house. For multifamily buildings, there may be a single gateway per floor, handling all of the thermostats in each apartment on that floor. It is likely that in many buildings, a single gateway could cover multiple floors, depending on the materials used and thickness of the floors. In one embodiment, a 900 MHz communication frequency may be used, which may penetrate building materials better than the 2.4 GHz frequency used for WiFi. A single WiFi access point may reach three or more floors in NYC apartment buildings, but the specific number of gateways can vary based on the specifics on the installation.

From a technical standpoint, a single gateway can "talk" to hundreds of thermostats. From a business model standpoint, it can be assumed that a single gateway is installed per floor.

For controlling temperature, the utility or facility manager may be given the ability to read the existing thermostat setting for each individual air conditioner and the current temperature in the room, and to issue a command to change the thermostat setting for each thermostat. The new thermostat settings can be the same for all air conditioners, or there can be different settings for each air conditioner—that decision may be up to the facility manager or utility. They may be allowed to raise the thermostat setting, thereby turning off power to the air conditioner while the room temperature reaches the new thermostat setting, thus saving electricity. Adjusting the thermostat upward to a new, higher level can appreciably reduce electrical demand, and still prevent temperatures from becoming unbearably hot (e.g. 95° F.). The utility or facility manager may also be permitted to shut off all power to any, all or groups of the air conditioners, assuming that there might be an emergency situation where that capability could be crucial. The energy load of each air conditioner and the energy required to cool the room it is located in may be calculated, which may be based also on historical data on room temperatures and energy usage. The calculated energy can then be correlated with outside temperature, to facilitate a prediction of energy consumption based on outdoor weather predictions.

The system may be designed for a central authority (facility manager, utility, government agency, etc.) to reduce the electrical demand attributed to window air conditioners and other energy intensive appliances. Because temperature and thermostat data can be continuously collected from all units, extremely granular information is available to the central authority to most judiciously reduce demand, whether that is to raise the thermostat setting of all units by a fixed amount (say 8° F.), set all units at the same thermostat setting (say 78° F.), or have individualized defaults for the units.

Thresholds or limits may also be used, for example if a patient is on life support equipment and the room temperature should not exceed 76° F., the thermostat for that room could be raised from 72 to 76° F., instead of to the 78° F. that may be the default.

In one embodiment, the wireless link is based on the IEEE 802.15.4 standard, which is the underlying radio layer for the ZigBee specification (e.g., Zigbee Specification, Dec. 1, 2006, Zigbee Alliance) and other protocols. The chip sets may have a range of 100 meters, but using the 900 MHz band instead of the 2.4 GHz may enable the signal to better penetrate walls and other obstacles. Transmission over 100 feet indoors, through walls and fireplaces may be implemented. FCC limits on transmit power may require multiple input and multiple output (MIMO) and other techniques to extend the range further.

The temperature control aspects may also be embedded within the air conditioner or other appliance itself, such as by the original manufacturer. Measuring the electrical load on the socket may also enable detection of whether the appliance has been unplugged from the electrical interface. An alarm may then be issued to the central server, wherein the appropriate person or entity can be informed that the appliance has been unplugged. If the electrical interface is unplugged, it may stop communicating with the central server, which can cause an alarm to be sent to the appropriate entity. If many units stop communicating, the avalanche of alarms can signify a significant event—most likely a power failure. Utility providers may have been able to better identify the scope and location of recent power outages if such a system had been in place.

The terms "connected" "coupled" and "attached" are used herein to refer to any type of relationship, direct or indirect, between the components in question, and may apply to electrical, mechanical, RF, optical or other couplings. In addition, any use of the term "first", "second" and so on is only to facilitate discussion, and does not necessarily infer any type of temporal or chronological relationship.

Those skilled in the art will appreciate from the foregoing description that the broad techniques of the embodiments of the present invention can be implemented in a variety of forms. For example, parameters other than temperature and price, such as humidity, moisture, pressure, flow, etc., may be readily monitored and controlled as described herein. Therefore, while the embodiments of this invention have been described in connection with particular examples thereof, the true scope of the embodiments of the invention should not be so limited since other modifications will become apparent to the skilled practitioner upon a study of the drawings, specifications, and following claims.

What is claimed is:

1. An electrical interface comprising:
    a switching mechanism having an unique identification to selectively couple a source of electricity to a load; and
    a control module coupled to the switching mechanism to generate a query to a web server, the query including the unique identification of the switching mechanism and control data, the control module to include a connection to a local transmission link-to-internet protocol (IP) gateway, wherein the control module is configured to:
    transmit the query to the local transmission link-to-IP gateway;
    receive a response from the local transmission link-to-IP gateway, wherein the response includes control information for the switching mechanism; and
    selectively couple the electrical interface to a source of electricity based on the received control information.

2. The electrical interface of claim 1, wherein the control module is to generate the query according to scheduling information stored at the electrical interface.

3. The electrical interface of claim 1, wherein the control data included in the query includes at least one of a thermostat setting, a price threshold and a power mode, and an indication of whether the data has changed.

4. The electrical interface of claim 1, wherein the query is to further include a load type identifier.

5. The electrical interface of claim 1, wherein the control information in the response from the web server is to include data having at least one of a thermostat setting, a current price of electricity, a price threshold, a power mode and scheduling information, the interface further including memory to store the data.

6. The electrical interface of claim 1, wherein the switching mechanism includes at least one of a relay, a circuit breaker and a thermostat.

7. The electrical interface of claim 1, further including a user interface to enable user control of the switching mechanism, the user interface having at least one of a display and an input device.

8. The electrical interface of claim 1, wherein the electrical interface further includes a socket coupled to the switching mechanism, the socket to mate with a power plug associated with the load.

9. The electrical interface of claim 1, wherein the query to the web server is a request for a web page, the request including status information of the switching mechanism; and the control module is configured to receive control packets contained in the requested web page which are used to control the switching mechanism.

10. The electrical interface of claim 9, wherein the control module is configured to modify settings of the switching mechanism based on data contained in the control packet including an indication of whether or not any change of the settings represents a server-based override.

11. The electrical interface of claim 1, wherein the switching mechanism directly couples electricity to the load.

12. The electrical interface of claim 1, wherein the control module periodically generates a query for updated control and/or scheduling information, wherein the query includes current status information of the control module.

13. A local transmission link to Internet protocol gateway comprising:
    a first interface to receive and forward a query for information from an electrical interface, the query to include an unique identifier of a switching mechanism in the electrical interface to a load, and first data having at least one of a thermostat setting, power mode and a price threshold, wherein the first interface is coupled to the switching mechanism that provides a source of electricity to the load;
    a processing module to convert the query into a web request, wherein the web request includes control and/or scheduling information based on the first data of the query; and
    a second interface to transmit the web request over Internet protocol to a web server and for receiving a response to the web request including updated control and/or scheduling information from the web server,
    wherein the response from the web server is provided to the electrical interface that initiated the query.

14. The local transmission link to Internet protocol gateway of claim 13, wherein the query further includes an indication of whether the first data has changed.

15. The local transmission link to Internet protocol gateway of claim 13, wherein the query further includes a load type identifier and the processing module is to convert the query into the web request based on the load type identifier.

16. The local transmission link to Internet protocol gateway of claim 13, wherein the second interface is to receive a response from the web server to the web request in a first format, the processing module is to convert the response into a second format, and the first interface is to transmit the response in the second format to the electrical interface.

17. The local transmission link to Internet protocol gateway of claim 16, wherein the response is to include second data having at least one of a thermostat setting, power mode, a current price of electricity, a price threshold and scheduling information.

18. The local transmission link to Internet protocol gateway of claim 13, wherein the first interface includes a local transmission link having at least one of a wireless, power line communication and Ethernet component, and the second interface includes an Ethernet port.

19. The local transmission link to internet protocol gateway of claim 13, wherein the local transmission link to internet protocol gateway does not require a pre-determined IP address.

20. The local transmission link to internet protocol gateway of claim 13, wherein all communications with a web server originate as queries from the electrical interface, and are reformatted into standard web requests to be sent to the web server.

21. The local transmission link to internet protocol gateway of claim 13, wherein the second interface includes a connection to internet protocol network for transmitting the web request to the web server.

22. The local transmission link to Internet protocol gateway of claim 13, wherein the second interface is assigned a temporary IP address from a local router or DHCP server, wherein the temporary IP address allows the response to the web request to be routed back to the second interface.

23. The local transmission link to Internet protocol gateway of claim 13, wherein the second interface uses an IP address that has permissions to make a web request and to receive a response to the web request.

24. A non-transitory computer-readable medium comprising a set of instructions which, when executed by a processor, cause a web server to:
receive a web request for information, the web request to include a unique identifier of a switching mechanism in an electrical interface to a load and control data having at least one of a thermostat setting, a price threshold and a power mode, wherein the electrical interface initiates a query from which the first web request was generated, and wherein the electrical interface is coupled to the switching mechanism that provides a source of electricity to the load;
retrieve a record associated with the unique identifier of the switching mechanism; and
generate a response to the web request based on the record, wherein the generated response includes updated control data of the identified switching mechanism.

25. The non-transitory computer-readable medium of claim 24, wherein the response is to include updated control data having at least one of a thermostat setting, a current price of electricity, a price threshold, a power mode and scheduling information.

26. The non-transitory computer-readable medium of claim 25, wherein the instructions, when executed by a processor, further cause the web server to query a pricing source for the current price of electricity to be included in the updated control data.

27. The non-transitory computer-readable medium of claim 25, wherein the instructions, when executed by a processor, further cause the web server to establish at least one of the thermostat setting, the price threshold and the power mode of the response based on the scheduling information.

28. The non-transitory computer-readable medium of claim 24, wherein the response is to include a reboot instruction.

29. The non-transitory computer-readable medium of claim 24, wherein the web request further includes an indication of whether the first data has changed, the web server to update the record based on the first data if the first data has changed.

30. The non-transitory computer-readable medium of claim 24, wherein the instructions, when executed by a processor, further cause the web server to:
receive a login request from a web-enabled device, the login request to include a user identifier and a password;
validate a user of the web-enabled device based on the login request;
retrieve a set of unique identifiers of electrical interfaces to loads associated with the user identifier; and
generate a web response to the login request based on the set of unique identifiers.

31. The non-transitory computer-readable medium of claim 30, wherein the instructions, when executed by a processor, further cause the web server to:
receive another web request to modify at least one of a thermostat setting, a price threshold, a power mode and a schedule associated with one or more of the set of unique identifiers; and
update a record associated with the one or more of the set of unique identifiers in response to the another web request.

32. The non-transitory computer readable medium of claim 24, wherein the generated response includes control updates related to the electrical interface referenced in the web request formulated in the query.

33. The non-transitory computer-readable medium of claim 24, wherein the instructions executed by the processor further cause the web server to:
receive authenticated data that is used to modify at least one of a thermostat setting, a price threshold, a power mode and a schedule associated with one or more of the set of unique identifiers; and
update a record associated with the one or more of the set of unique identifiers in response to a second web request.

34. An electrical interface comprising:
a switching mechanism to selectively couple a source of electricity to an electrical device;
a control module coupled to the switching mechanism to generate a query for information from a web server, to transmit the query to a local transmission link-to-Internet protocol gateway and to control the switching mechanism based on a response to the query, the query to include a unique identifier of the electrical interface and first data having at least one of a thermostat setting, a price threshold and a power mode, and an indication of whether the first data has changed, the response to include a control data packet including second data having at least one of a thermostat setting, a current price of electricity, a price threshold, a power mode and scheduling information;
a memory to store the first and second data; and
a user interface to enable user control of the switching mechanism.

35. The electrical interface of claim 34, wherein the control module is to generate the query according to scheduling information stored in the memory.

36. The electrical interface of claim 34, further including a socket coupled to the thermostat, the socket to mate with a power plug associated with the air conditioner.

37. The electrical interface of claim 34, wherein the query is to further include a load type identifier.

38. The electrical interface of claim 34, wherein the control module makes a determination based on a schedule information to generate a query for updated control and scheduling information, wherein the query includes current status information of the control module.

39. The electrical interface of claim 34, wherein the control module periodically generates a query for updated control and/or scheduling information, wherein the query includes current status information of the control module.

40. A system comprising:
an electrical interface having a unique identification configured to:
  control a supply of electricity to a load using control data,
  generate a query for updated control data,
  wait for updated control data to be provided in response to the generated query; and
  react to the updated control data to control the supply of electricity to the load;
a local transmission link to Internet protocol gateway, coupled to the electrical interface, configured to:
  translate the query from the electrical interface for transmission as a web request over an internet protocol communication link,
  convert a received response to the web request for communication to the electrical interface, wherein the received response includes the updated control data; and
  transmit the converted response to the electrical interface.

* * * * *